H. W. SEEGE.
REVERSIBLE DRIVE FOR WASHING MACHINES.
APPLICATION FILED OCT. 22, 1920.
1,404,166.
Patented Jan. 17, 1922.
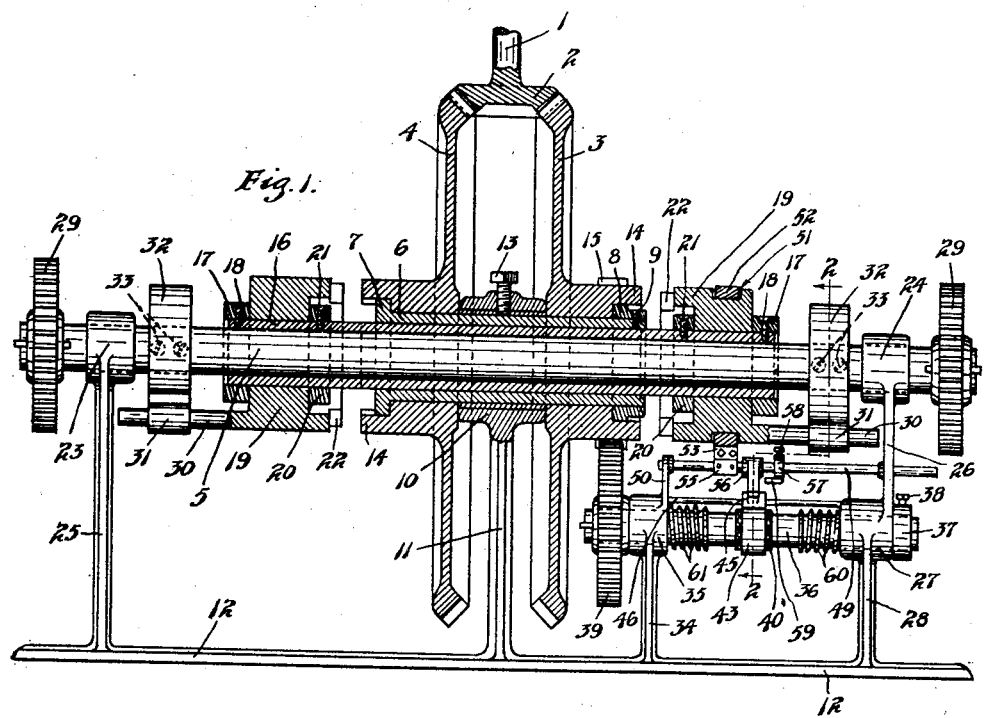
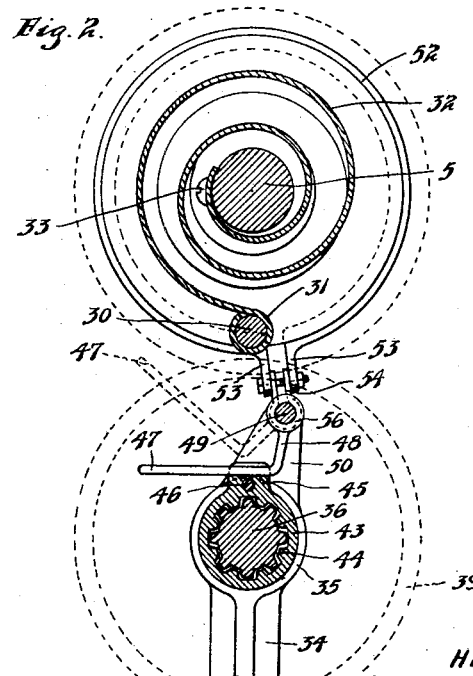
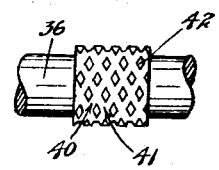
INVENTOR.
HERMAN W. SEEGE.
BY HIS ATTORNEYS.
James F. Williamson

UNITED STATES PATENT OFFICE.

HERMAN W. SEEGE, OF MINNEAPOLIS, MINNESOTA.

REVERSIBLE DRIVE FOR WASHING MACHINES.

1,404,166. Specification of Letters Patent. Patented Jan. 17, 1922.

Application filed October 22, 1920. Serial No. 418,732.

*To all whom it may concern:*

Be it known that I, HERMAN W. SEEGE, a citizen of the United States, residing at Minneapolis, in the county of Hennepin and State of Minnesota, have invented certain new and useful Improvements in Reversible Drives for Washing Machines; and I do hereby declare the following to be a full, clear, and exact description of the invention, such as will enable others skilled in the art to which it appertains to make and use the same.

The present invention relates to a reversing mechanism, and while such a mechanism can be readily used on any machine where a reversible drive is desirable, the invention is particularly designed for use as a reversible drive for a washing machine. In the modern type of cylinder washing machine it is the common practice to drive the cylinder for a certain number of turns in one direction and then reverse the rotation for a certain number of turns.

One object of the present invention is to provide a simple and efficient reversing mechanism and one which has a minimum of parts which are liable to be broken in use.

It is another object of the invention to devise a reversing mechanism for washing machines in which the shock of the reversing movement is absorbed and a minimum of vibration produced.

Other objects of the invention will appear as the description proceeds in connection with the accompanying drawings, in which like reference characters refer to the same parts throughout the different views and in which, Fig. 1 represents a front elevation of the device with a number of the parts shown in section;

Fig. 2 is a section on the line 2—2 of Fig. 1;

Fig. 3 is a detail view showing the type of thread used on the reversing mechanism.

Referring to the drawings, the shaft through which the power is transmitted to the driving mechanism is indicated by 1, and carries a pinion 2 which is in continuous engagement with the gears 3 and 4. In the actual embodiment of the structure, the shaft 1 and pinion 2 would be disposed in a horizontal plane with the center in the same plane as the center of shaft 5. For better illustration the parts 1 and 2 are shown in position illustrated in the drawing. The shaft 1 is designed to be connected to a motor or any suitable source of power. As gears 3 and 4 are continually in mesh with pinion 2, these gears will be driven in opposite directions. The gears 3 and 4 are rotatively mounted on a sleeve 6 which has a collar 7 formed on one end thereof seated in a recess in gear 4 and the other end of said sleeve is arranged to receive a collar 8 which is fitted thereon and securely held in place by a set screw 9. The sleeve 6 is carried in a bearing 10 supported by a standard 11 that rises from the base 12 near the center thereof. The sleeve 6 is held rigidly in said bearing by means of a set screw 13. The collar 8 is also arranged to seat in a recess in the hub of gear 3 and the gears are held in position between this collar and the collar 7. Surrounding the recesses in which the collars 7 and 8 are disposed are a series of clutch teeth 14 formed on the hubs of gears 3 and 4 and the hub of gear 3 has formed thereon, in addition, gear teeth 15.

Disposed within the sleeve 6 is another sleeve 16 which is loosely fitted therein and arranged for sliding movement therethrough. The sleeve 16 has collars 17 firmly secured to each end thereof by set screws 18, and a clutch 19 is arranged at each end of the sleeve 16 and held in fixed position longitudinally between the collars 17 and similar collars 20 which are carried in recesses in the said clutches and firmly secured to the sleeve by set screws 21. On the ends adjacent the gears 3 and 4, the clutches are formed with a series of clutch teeth 22. The sleeve 16 is adapted to be moved longitudinally in the sleeve 6 to bring the clutch teeth 22 into engagement with the teeth 14 of either one of the gears 3 or 4.

Rotatably mounted within the sleeve 16 is a shaft 5 which is also supported near its outer end in bearings 23 and 24. The bearing 23 is supported on a standard 25 rising from base 12, near one end thereof and a bearing 24 is supported by standard 26 which rises from a bearing 27 supported by a standard 28 which rises near the other end of the base 12. At the ends of shaft 5 are keyed, or otherwise fastened, the gears 29. These gears are adapted to be connected in any suitable manner to drive the cylinder of a washing machine. It will also be understood that they may be suitably connected to any driven device which it is desired to drive with a reversible mechanism.

Each of the clutch members 19 carries a projecting pin or shaft 30. These pins project outwardly from said clutch members and are disposed in sleeves 31 formed on the ends of coiled plate springs 32. The other ends of these springs are rigidly secured to shaft 5 by means of screws 33, the springs being disposed about shaft 5 between the collars 17 and the bearings 23 and 24. It will be noted by observing Fig. 1, that these springs are oppositely disposed about shaft 5.

Rising from base 12, adjacent the standard 28 is another standard 34 carrying at its upper end a bearing 35, which bearing is in alignment with the bearing 27. The shaft 36 is rotatably supported in bearings 27 and 35, which shaft has, at one end, outside of bearing 27, a collar 37 secured thereto by a set screw 38, and at its other end, outside of bearing 35, this shaft carries a gear 39. The gear 39 is keyed, or otherwise rigidly secured to the shaft 36 and is arranged to mesh with and be driven by the gear 15 formed on the hub of gear 3. The shaft 36 has formed thereon midway between bearings 27 and 35 an enlarged portion in which are cut oppositely disposed threads 40 and 41, leaving therebetween projections 42. A nut member 43 having projecting from its interior a series of similar projections 44, is adapted to surround and be traversed by the threaded portion of shaft 36. This nut member 43 has a lug 45 projecting therefrom and a rod 46 which extends between bearings 27 and 35, is arranged to slide in a bore in the lug 45 to prevent rotation of the nut member 43 and also act as a steadying means for the same. The lug 45 has a slot in the top portion thereof extending normal to the rod 46, and this slot is adapted to receive an arm 47 on the lever 48, which is pivoted on a rod 49. The rod 49 extends parallel to the shaft 36 above the same and is carried at one end by a bracket 50 rising from bearing 35, and at its other end, is carried by standard 26. The clutch 19, which is disposed above shaft 36, has a circumferential groove 51 formed therein, in which a clutch fork or ring 52 engages. This clutch fork has projections 53 at its lower side which are spaced to receive the ends 54 of a similar fork or clamping ring 55 which is disposed about and firmly secured to the rod 49. The ring 55, as shown in Fig. 1, is disposed upon one side of the hub 56 of lever 48 and disposed upon the other side thereof is a collar 57 carried on rod 49 and firmly secured thereto by set screws 58. A lug 59 projects laterally toward the lever 48 from the lower side of collar 57. Disposed about the shaft 36 adjacent the bearings 27 and 35 are coiled springs 60 and 61 which extend some distance from the bearings toward the threaded portion of the shaft.

The operation of the device is as follows. Power will be applied to shaft 1 and pinion 2, and gears 3 and 4 will be continuously driven in opposite directions. The gear 15 on the hub of gear 3 will rotate shaft 36 through the gear 39. The nut member 43 will be traversed along shaft 36, for example, to the right, as shown in Fig. 1. This member 43 will continue its travel until it becomes disengaged from the thread on shaft 36. At this time, however, it will contact with and compress spring 60. This spring, therefore, will force the said member to the left, as shown in Fig. 1 and the teeth 44 of said member 43 will be again engaged with the thread on shaft 36. This engagement of the thread will tend to traverse the member 43 to the left, and said member will thus be traversed in this direction. When the member 43 moves to the right it will carry with it the lever 48 and the hub 56 of this lever will engage with collar 57 and this collar will also be moved to the right, as will the rod 49 and the clutch ring 52 which is secured thereto. The clutch 19, at the right of Fig. 1, will thus be moved to the right, and by means of collar 17, will move sleeve 16 in the same direction. The sleeve 16, by means of collar 17 at the left end thereof, will carry the clutch 19 at the left side of the machine, as shown in Fig. 1, to the right and the teeth 22 thereof will be moved into engagement with the teeth 14 of gear 4. This clutch will then be rotated with gear 4 and this rotation will be transmitted to shaft 5 through spring 22 at the left of the machine. When this spring is placed under sufficient tension by being wound about the shaft, it will transmit rotation thereto, and the gear 29 and connected devices will be driven in one direction. This rotation of gear 29 will continue until the nut member 43 traverses to the left, as shown in Fig. 1, sufficiently to disengage from the threaded portion of shaft 36 and slightly compress the spring 61. Just before this occurs, the hub 56 will engage with the member 55 and the clutch ring 52 will be moved to the left carrying with it the clutch 19 shown at the right of the machine. By means of the collars 20 and 21, the sleeve 16 will be moved to the left and the clutch 19 at the left of the machine will be disengaged from gear 4 and the teeth 22 of this clutch 19 will be moved into engagement with the teeth 14 of gear 3. When the clutch 19 is disconnected from gear 4, the gear 29 will cease to be driven, and as the clutch 19 at the right of the machine comes into engagement with gear 3, it will be driven in the direction of said gear and will transmit rotation to the shaft 5 through the spring 32 on the right. The gear 29 at the right of the machine and attached devices will now be driven in the opposite direction from which gear 29 at the left is driven. The nut member 43 will be pushed into re-engagement with the threaded portion of shaft 36 and again begin its travel to the right. The rotation of gear 29, just described will thus continue until the hub 56 again engages collar 57 when the rotation will be reversed, as above described. It will be noted that both the gears 29 are rigidly secured to shaft 5, and the direction of both gears, as well as the shaft, is reversed.

If it be desired to drive continuously in one direction, the arm portion 47 of lever 48 can be lifted from the slot in lug 45 and one of the clutches 19 moved into engagement with its respective gears 3 and 4. The device will then drive continuously in the selected direction. If it be desired to stop the drive, the clutches will be moved to neutral position, as shown in Fig. 1. The arm 47 will then be lifted out of the slot in lug 45 and can be moved along rod 49 into position to be supported by the lug projection 59. The gears 3 and 4 will then run idly without transmitting any motion to the gears 29 or the connecting devices.

It will be seen that by interposing the springs 32 between the clutches and the shaft 5, the shock of the reverse will be absorbed and reverse movement gradually started. This is an important feature and one which results in a minimum of vibration and consequent wear on both the driving device and the machine being driven. It will also be seen that applicant has produced a very simple and efficient reversing mechanism consisting of comparatively few parts of such a nature that the device will require a small amount of attention.

It will, of course, be understood that various changes in the form and detail of the parts may be made without departing from the scope of the invention, which, generally stated, consists in the matter shown and described, and set forth in the appended claims.

What I claim is:

1. A reversing device having in combination a driving member adapted to be connected to a suitable source of power, two driven members in engagement therewith and driven thereby in opposite directions, a pair of clutch members arranged for alternate engagement with one or the other of said driven members, a driven shaft, oppositely disposed spiral springs having one end thereof rigidly secured to said shaft, and means connecting said clutch members to the other ends of said springs.

2. A reversing mechanism having in combination driving beveled gears adapted to be connected to a suitable source of power, two driven members for engagement therewith driven thereby in opposite directions, a driven shaft, a pair of clutch members yieldingly connected to said shaft and arranged for alternate engagement with one or the other of said driven members, a second shaft, means for driving said second shaft from one of said driven members, and an automatic shifting mechanism carried by said second shaft to move said clutch members alternately into engagement with said driven member.

3. A reversing mechanism having in combination two members driven in opposite directions, a driven shaft, means for alternately connecting said members to said shaft comprising clutch members slidable on said shaft, a second shaft, means for driving the same from one of said driven members, an automatic tripping mechanism carried by said second shaft comprising a threaded portion on said shaft having oppositely disposed threads therein, a spring surrounding said shaft at each side of said threaded portion, and a nut member arranged to move said clutch members and adapted to engage said threads and be traversed in opposite directions to engage first one spring and then the other.

4. A reversing mechanism having in combination a central bearing having a sleeve rigidly supported therein, oppositely driven members at each side of said bearing rotatably mounted on said sleeve, a second sleeve slidable in said sleeve and carrying oppositely disposed clutch members adapted by the sliding movement of said sleeve to be alternately engaged with either of said driven members, a shaft rotatably mounted in said second sleeve, and independent yielding means connecting each of said clutch members with said shaft whereby said shaft may be rotated in opposite directions by said clutch member.

5. A reversing mechanism having in combination a bearing, a sleeve rigidly secured therein, oppositely driven members at opposite sides of said bearing, a second sleeve rotatably mounted in said first sleeve and having a pair of clutch members rotatively mounted thereon and reciprocated thereby, to alternately engage said driven members, a shaft rotatably mounted in said second sleeve, a pair of oppositely disposed torsion springs having one end thereof connected to said shaft and pins on said clutch members slidably connected to said springs at their other ends whereby the shaft may be driven in opposite directions by said clutch members through the springs.

6. A reversing mechanism having in combination a driven shaft supported in fixed bearings, a sleeve slidable thereon and having oppositely disposed clutch members, oppositely disposed beveled gears journaled on said sleeve and comprising clutch members arranged to alternately be engaged by said clutch members on said sleeve, a common driving gear for said beveled gears rotating the same in opposite directions, and means for connecting said shaft to said clutch members on said sleeve.

7. The structure set forth in claim 6, said last mentioned means being resilient.

8. The structure set forth in claim 6, said last mentioned means comprising spiral springs connected to said shaft and to said clutch members on said sleeve.

9. A reversing mechanism having in combination a driving beveled gear oppositely disposed beveled gears meshing therewith and driven thereby in opposite directions, each having a clutch member thereon, supported driven shafts, oppositely disposed clutch members slidable thereon arranged for alternate engagement with said clutched on the beveled gears, one of said beveled gears having a second gear formed thereon, a second shaft having a gear thereon and in mesh with said last mentioned gear and driven thereby, a reversing member reciprocated on said shaft, a fixed clutch rod, a member slidable thereon and moved by engagement with said reciprocating member, a clutch ring for one of said clutch members on said first mentioned shaft having means secured thereto and embracing said clutch rod, and a fixed collar on said clutch rod, said member which is rotatable on said clutch rod being movable into engagement with said means and said collar alternately to move the clutches on said shaft into alternate engagement with said clutches on the beveled gears.

In testimony whereof I affix my signature.

HERMAN W. SEEGE.